(12) United States Patent
Rune et al.

(10) Patent No.: US 10,243,750 B2
(45) Date of Patent: Mar. 26, 2019

(54) CORE-NETWORK CONTROL OF LOCAL BREAK-OUT FOR A DISTRIBUTED CLOUD

(71) Applicant: Telefonaktiebolaget LM Ericsson (publ), Stockholm (SE)

(72) Inventors: Johan Rune, Lidingö (SE); Lars Westberg, Enköping (SE); Vinay Yadhav, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/551,922

(22) PCT Filed: Feb. 20, 2015

(86) PCT No.: PCT/EP2015/053628
§ 371 (c)(1),
(2) Date: Aug. 18, 2017

(87) PCT Pub. No.: WO2016/131493
PCT Pub. Date: Aug. 25, 2016

(65) Prior Publication Data
US 2018/0248707 A1    Aug. 30, 2018

(51) Int. Cl.
| H04W 8/08 | (2009.01) |
| H04W 88/18 | (2009.01) |
| H04L 12/14 | (2006.01) |
| H04L 12/26 | (2006.01) |
| H04L 29/08 | (2006.01) |
| H04W 88/16 | (2009.01) |

(52) U.S. Cl.
CPC ...... *H04L 12/1407* (2013.01); *H04L 43/0876* (2013.01); *H04L 67/34* (2013.01); *H04W 8/082* (2013.01); *H04W 88/16* (2013.01); *H04W 88/18* (2013.01)

(58) Field of Classification Search
CPC . H04L 12/1407; H04L 43/0876; H04L 67/34; H04W 8/082; H04W 88/16; H04W 88/18
See application file for complete search history.

(56) References Cited

U.S. PATENT DOCUMENTS

| 8,385,290 B2 | 2/2013 | Kato et al. |
| 2002/0049913 A1* | 4/2002 | Lumme ................... H04L 63/30 726/13 |

(Continued)

FOREIGN PATENT DOCUMENTS

| CA | 2718055 C | 12/2013 |
| WO | 2010086014 A1 | 8/2010 |
| WO | 2011053040 A2 | 5/2011 |

*Primary Examiner* — Marisol Figueroa
(74) *Attorney, Agent, or Firm* — Patent Portfolio Builders, PLLC

(57) ABSTRACT

The present disclosure generally relates to the field of local break-out traffic. More specifically, the present disclosure relates to a technique of selective copying of data related to traffic that is routed locally in a wireless communication network. A method embodiment comprises: selectively copying data related to locally routed traffic based on one or more control parameters received from a core network (40), the locally routed traffic being routed locally between at least one wireless device (10) and a local service cloud (30); and forwarding the copied data related to the locally routed traffic to the core network (40).

21 Claims, 10 Drawing Sheets

(56) References Cited

U.S. PATENT DOCUMENTS

| | | |
|---|---|---|
| 2009/0232019 A1 | 9/2009 | Gupta et al. |
| 2010/0299173 A1 | 11/2010 | Zampiello et al. |
| 2012/0076303 A1 | 3/2012 | O'Leary |
| 2014/0036897 A1 | 2/2014 | Frydman et al. |

* cited by examiner

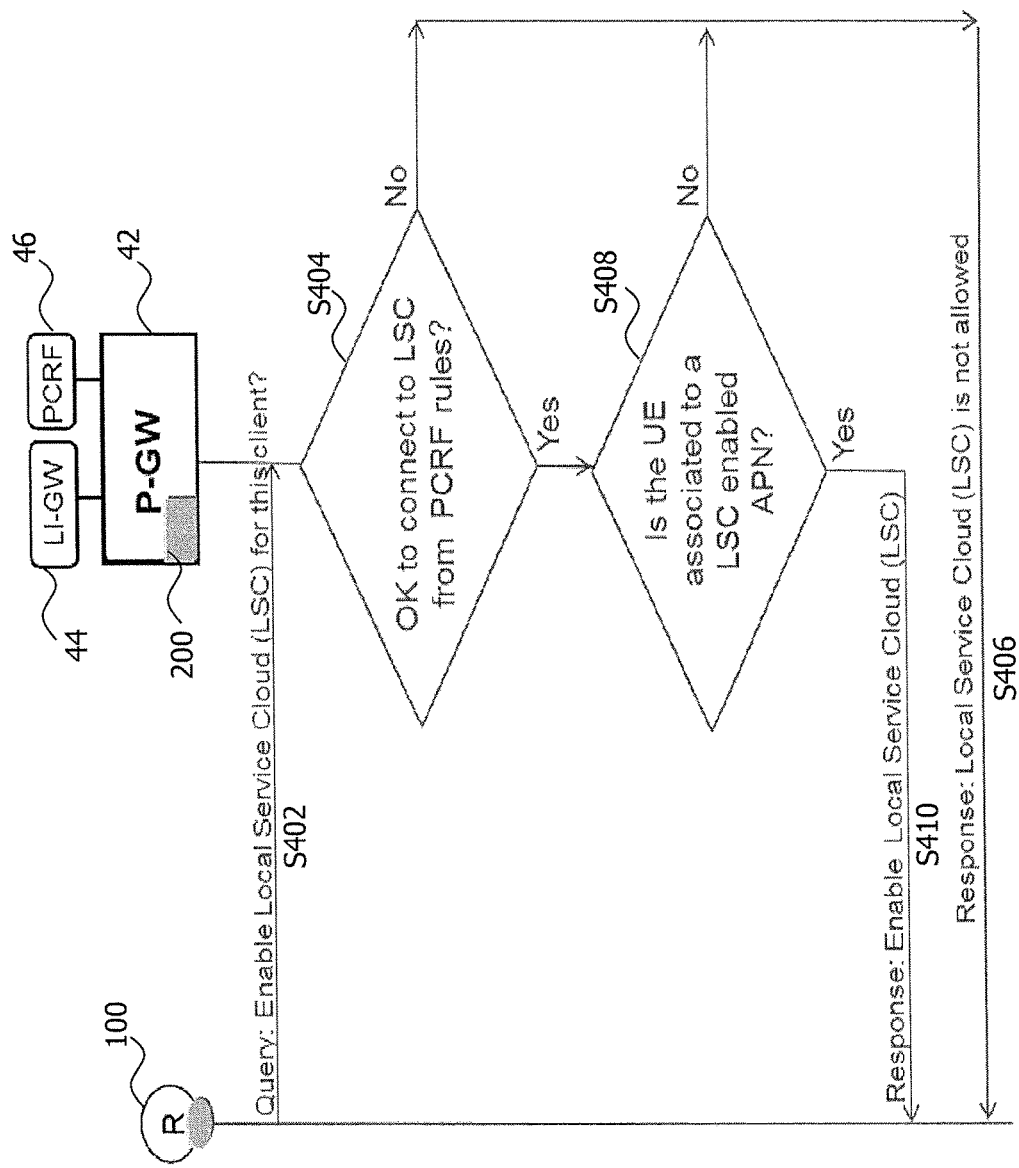

CORE-NETWORK CONTROL OF LOCAL BREAK-OUT FOR A DISTRIBUTED CLOUD

TECHNICAL FIELD

The present disclosure generally relates to the field of local break-out traffic. More specifically, the present disclosure relates to a technique of selective copying of data related to traffic that is routed locally in a wireless communication network.

BACKGROUND

A concept that has been discussed recently is to deploy a service cloud locally in a cellular network. Such a locally deployed service cloud may also be referred to as Local Service Cloud (LSC). An LSC may be collocated with a base station of the cellular network. In this case, traffic to the backhaul transport network can be reduced as the traffic is locally routed between the base station and the LSC without passing the core network. As a consequence, the end to end delay and thus the application response time can be reduced. Such a service cloud may be considered a pool of server hardware and/or virtual machines (VMs) hosting third party services and operator services, but potentially also transport and network related features such as compression.

Traffic from a User Equipment (UE) to an application in the LSC can be broken out locally by the base station. A technique for local break-out (sometimes also referred to as local breakout or local break out or in short just LBO) of traffic is, for example, described in U.S. Pat. No. 8,385,290 B2. In U.S. Pat. No. 8,385,290 B2, a method and apparatus for handling an LBO session taking place in a first network between a UE and a corresponding node (CN) is described. Another LBO technique is disclosed by CA2718055 C. In CA2718055 C, LBO is provided by one or more nodes (e.g., a local access point and/or a local gateway) in a wireless network to facilitate access to one or more local services. Further, WO 2010/086014 A1 describes a method and device for data processing in an access point supporting LBO.

The LBO function may be or comprise a router that has Internet Protocol (IP) filters that inspect the passing IP packets and filter out packets which are routed to other networks (for example, a home-network) or to a local cloud such as an LSC. Thus, the locally broken out traffic, which may also be called LBO traffic is routed locally to the LSC rather than being transmitted to the core network of the cellular network. As a consequence, functionalities residing in the core network such as Legal Intercept (sometimes also referred to as Lawful Intercept, Legal Interception, Lawful Interception or in short just LI) and charging and policy control functions are not in the path of the LBO traffic. Thus, such regular core network functionality cannot act on the locally generated traffic and apply LI and/or charging. On the other hand, certain services and applications can greatly profit in usability and efficiency if they are performed in a LSC.

SUMMARY

Accordingly, there is a need for an improved technique of interworking of core network functionalities and local break-out traffic/locally routed traffic.

According to a first aspect, a method of selectively copying data in a wireless communication network is provided. The wireless communication network comprises at least one wireless device, a core network, and a local service cloud. The local service cloud provides at least one of services and applications for the at least one wireless device. The method comprises selectively copying data related to locally routed traffic based on one or more control parameters received from the core network. The locally routed traffic is routed locally between the at least one wireless device and the local service cloud. The method further comprises forwarding the copied data related to the locally routed traffic to the core network.

The method may comprise selecting data to be copied based on the one or more control parameters from the core network. The copied data may comprise at least one of one or more packets of the locally routed traffic, header information of one or more packets of the locally routed traffic, information about one or more web addresses of the locally routed traffic and information about the amount of the locally routed traffic.

The step of selectively copying data related to locally routed traffic may comprise copying one or more packets of the locally routed traffic, if the at least one wireless device is subject to lawful interception. Alternatively or additionally, the step of selectively copying data related to locally routed traffic may comprise copying information about one or more web addresses of the locally routed traffic, if the locally routed traffic is subject to service based charging in the core network. Alternatively or additionally, the step of selectively copying data related to locally routed traffic may comprises copying information about the amount of the locally routed traffic, if the locally routed traffic is subject to traffic volume based charging or bucket charging in the core network.

For example, as only a fraction of users may be exposed to lawful interception it is more backhaul efficient to selectively copy only the traffic of those users that are subject to lawful interception. In case of charging policies, some charging techniques residing in the core network may only need certain fractions or portions of the locally routed traffic not the whole traffic. As another example, bucket charging may be made on counting transferred uplink/downlink bytes. This is more backhaul efficient than copying all traffic to the core network. Similarly, service based charging can be applied on Hypertext Transfer Protocol (HTTP) Uniform Resource Locators (URLs) or the like rather than on the content of the traffic. In this case, only the HTTP URLs may be required to activate the charging rules.

The wireless communication network may comprise a plurality of wireless devices, while only a subset of the plurality of wireless devices exchanges traffic with the local service cloud, i.e. for only a subset of the plurality of wireless devices traffic is routed locally to and from the local service cloud. Depending on the one or more control parameters, the traffic of only one or more of the subset of wireless devices may be selectively copied.

The method may comprise receiving one or more updated control parameters from the core network. In this way it may be ensured that always the up-to-date control parameters are applied. This may ensure to selectively copy only that part of the locally routed traffic that is in line with the one or more updated control parameters.

The one or more control parameters may comprise at least one of information related to policies contained in the core network, information related to charging rules contained in the core network, information about an Access Point Name (APN) of the core network, subscription information contained in the core network, information related to geographical location(s) or region(s) and information related to lawful interception contained in the core network.

The method may comprise randomly selecting one or more of the at least one wireless device and copying data related to the locally routed traffic being routed locally between the one or more selected wireless devices and the local service cloud. The one or more wireless devices may be randomly selected to hide that other wireless devices are subject to lawful interception.

The step of randomly selecting one or more of the at least one wireless device may comprise randomly selecting the one or more wireless devices with a fixed probability. Alternatively, the step of randomly selecting one or more of the at least one wireless device may comprise randomly selecting the one or more wireless devices with an adjustable probability. The adjustable probability may be adapted by taking into account the total number of wireless devices that are subject to lawful interception. The adjustable probability may be adapted such that the adjustable probability is increased when the number of wireless devices that are subject to lawful interception is below a predetermined value and the adjustable probability is decreased when the number of wireless devices that are subject to lawful interception is above a predetermined value. In this way, lawful interception may be efficiently hidden. For example, a threshold related to an amount of simultaneous active users may be used as the predetermined value. As active users have an established tunnel to the core network it is possible to count them. In this way, for example, copying on end-users local traffic may be enabled during low-traffic periods. This may lead to a reduction on the backhaul transmission.

There may be a total number of wireless devices in the wireless communication network. In this case, the step of randomly selecting may comprise randomly selecting a certain number out of the total number of wireless devices. The certain number could be pre-determined/fixed, or random and/or dependent on the total number of connected wireless devices and/or the total number of wireless devices subject to lawful interception.

The one or more control parameters received from the core network may control at least one of a probability with which the one or more of the at least one wireless device are randomly selected, and an algorithm for adjusting a probability with which the one or more of the at least one wireless device are randomly selected.

According to a second aspect, a method of supporting selective copying of data in a wireless communication network is provided. The wireless communication network comprises at least one wireless device, a core network, and a local service cloud. The local service cloud provides at least one of services and applications for the at least one wireless device. The method comprises providing, by the core network, one or more control parameters to enable selective copying of data related to locally routed traffic based on the one or more control parameters provided by the core network. The locally routed traffic is routed locally between the at least one wireless device and the local service cloud. The method further comprises receiving, by the core network, the copied data related to the locally routed traffic.

The method may comprise determining whether copying of the data related to the locally routed traffic is required by the core network, and, if copying of the data is required, activating selective copying of the data related to the locally routed traffic.

The method may comprise updating the one or more control parameters and providing the one or more updated control parameters. In this way it may be ensured that always the up-to-date control parameters are applied.

The step of updating the one or more control parameters may comprise updating at least one of updating information related to lawful interception contained in the core network, updating information related to policies contained in the core network and updating information related to charging rules contained in the core network.

The method may comprise at least one of analyzing the copied data related to the locally routed traffic in the core network; carrying out service based charging in the core network based on the copied data related to the locally routed traffic, and carrying out traffic volume based charging or bucket charging in the core network based on the copied data related to the locally routed traffic.

According to a third aspect, a method of selectively copying data in a wireless communication network is provided. The wireless communication network comprises at least one wireless device, a core network, and a local service cloud. The local service cloud provides at least one of services and applications for the at least one wireless device. The method comprises providing, by the core network, one or more control parameters. The method further comprises selectively copying data related to locally routed traffic based on the one or more control parameters received from the core network, wherein the locally routed traffic is routed locally between the at least one wireless device and the local service cloud. The method further comprises forwarding the copied data related to the locally routed traffic to the core network. The method further comprises receiving, by the core network, the copied data related to the locally routed traffic.

According to a fourth aspect, a computer program is provided. The computer program comprises program code portions for causing the steps of any one of the method aspects described herein to be performed, when the computer program is run on a computer system or on one or more computing devices, e.g. an apparatus, like a base station, or an entity as disclosed herein. The computer program may be stored on a computer-readable recording medium or may be downloadable as a signal.

According to a fifth aspect, an apparatus for selectively copying data in a wireless communication network is provided. The wireless communication network comprises at least one wireless device, a core network, and a local service cloud. The local service cloud provides at least one of services and applications for the at least one wireless device. The apparatus comprises a copying component and a forwarding component. The copying component is configured to selectively copy data related to locally routed traffic based on one or more control parameters received from the core network. The locally routed traffic is routed locally between the at least one wireless device and the local service cloud. The forwarding component is configured to forward the copied data related to the locally routed traffic to the core network.

The apparatus according to the fifth aspect may be configured to perform any of the method steps of the method according to the first aspect described herein.

According to a sixth aspect, a base station is provided. The base station may comprise the apparatus according to the fifth aspect. The base station may comprise or may be configured as a Base Transceiver Station, a NodeB, an eNode or the like. In this respect, the wireless communication network may comprise a plurality of base stations such as a plurality of eNodeBs in terms of Long Term Evolution (LTE).

According to a seventh aspect, a core network entity for supporting selective copying of data in a wireless communication network is provided. The wireless communication network comprises at least one wireless device, a core network, and a local service cloud. The local service cloud provides at least one of services and applications for the at least one wireless device. The core network entity comprises a providing component and a receiving component. The providing component is configured to provide one or more control parameters to enable selective copying of data related to locally routed traffic based on the one or more control parameters provided by the core network. The locally routed traffic may be routed locally between the at least one wireless device and the local service cloud. The receiving component is configured to receive the copied data related to the locally routed traffic.

The core network entity according to the seventh aspect may be configured to perform any of the method steps of the method according to the second aspect described herein.

According to an eighth aspect, a system is provided. The system comprises at least one of the apparatus according to the fifth aspect, the base station according to the sixth aspect, and the core network entity according to the seventh aspect.

The system according to the eighth aspect may be configured to perform any of the method steps of the method according to the third aspect described herein.

In general, the steps of any one of the method aspects described herein may equally be embodied in one or more suitable components, devices or units, e.g. in suitable components of the apparatus, the base station, the core network entity and/or the system.

BRIEF DESCRIPTION OF THE DRAWINGS

In the following, the present disclosure will further be described with reference to exemplary embodiments illustrated in the Figures, in which:

FIG. 3a is a flowchart illustrating a method embodiment performed in the apparatus of FIG. 1a;

FIG. 4 is a flowchart illustrating details that may be performed prior to the method embodiments of FIGS. 3a and 3b;

DETAILED DESCRIPTION

Figure 1B:
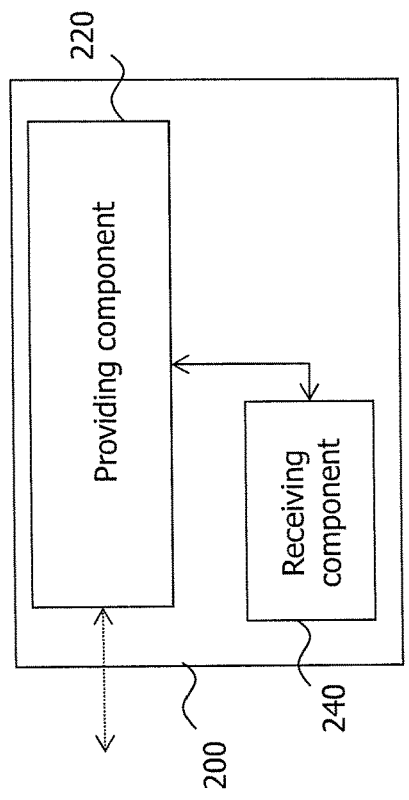
FIG. 1b is a schematic illustration of an embodiment of a core network entity.

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is described with reference to LTE as a specific example for a wireless communication network, the present disclosure may be practiced in any network to which mobile or stationary users may attach. For example, the present disclosure is applicable to other cellular networks such as Global System for Mobile Communications (GSM), Universal Mobile Telecommunications System (UMTS), LTE-Advanced (LTE-A) networks, or to Wireless Local Area Network (WLAN) or similar wireless networks. Further, although it is sometimes referred to below only to certain core network nodes, the general concepts described below may equally be applicable to other core network nodes as well.

Those skilled in the art will further appreciate that functions explained herein below may be implemented using individual hardware circuitry, using software functioning in conjunction with one or more processors, e.g. a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor arrangement and a memory arrangement coupled to a processor arrangement, wherein the memory arrangement is encoded with or stores one or more programs or corresponding code to cause the processor arrangement to perform or control the methods disclosed herein when executed by the processor arrangement.

The locally routed traffic described herein may comprise traffic in uplink direction from at least one wireless device to a local service cloud and/or traffic in downlink direction from the local service cloud to the at least one wireless device. The locally routed traffic may also be referred to as local break-out traffic. The locally routed traffic may be broken out by a local break-out function and routed to the local service cloud instead of to the core network. For example, the local break-out function may be or comprise a router that has Internet Protocol (IP) filters that inspect the passing IP packets and filter out packets which are routed to the local service cloud. Thus, the locally broken out traffic may be routed locally to the local service cloud rather than being transmitted to the core network of a cellular network. This implies that the core-network is bypassed by the locally routed traffic. The local break-out function may reside in the base station, e.g. may be an integral part of the base station, or may be a separate entity. In case the local break-out function is an entity separate from the base station, the local break-out function may be collocated/co-located with the base station or may be located at a separate site.

By selectively copying the locally routed traffic and forwarding the copied traffic to the core network, as described herein, at least a part of the traffic between the at least one wireless device and the local service cloud is also provided to the core network, while the traffic between the at least one wireless device and the local service cloud is kept intact (unchanged). As a consequence, functionalities residing in the core network such as Legal Intercept (Lawful Intercept/Legal Interception/Lawful Interception or in short just LI) and charging and policy control functions that are not in the path of the local break-out traffic, can still be applied to the copied traffic. Thus, the regular core network functionality can act on the locally generated and copied traffic to apply core network functions such as LI and/or charging and policy control functions.

The step of forwarding as described herein may include the step of selectively copying as described herein or vice versa. In this case, the steps of selectively copying and forwarding may be carried out as one step. Alternatively, the steps of copying and forwarding may be carried out separately, e.g., one after the other. In this case, the steps of selectively copying and forwarding may be considered separate steps.

The core network may comprise one or more core network entities. The one or more core network entities may generate the one or more control parameters dependent on certain functions to be performed, in the core network, on the copied traffic. The one or more core network entities may comprise a Public Data Network (PDN) Gateway (PGW or P-GW), a Gateway General Packet Radio Service (GPRS) Support Node (GGSN) and a Policy and Charging Rules Function (PCRF). For example, in case of a PCRF, the PCRF may generate one or more control parameters in order to apply policy rules on the copied traffic. By forwarding the copied traffic to the core network, interworking with one or more core network functions is enabled. For example, interworking with the PCRF and LI functionality in the core network may be enabled.

As described herein, locally routed traffic is selectively copied. The locally routed traffic may be the traffic which is routed locally between the local service cloud and the at least one wireless device. For example, the locally routed traffic may be the traffic routed between a local breakout function such as a local breakout router and the local service cloud. The copying and/or forwarding function may be added to the local break-out function or may be a separate entity or function. For example, the local breakout router may include a copying function for copying of locally routed/local break-out traffic, e.g. copying of traffic which is exchanged between the local service cloud and the at least one wireless device. The copied traffic may be copied and sent uplink to the core network. For example, the copied traffic may be sent uplink to the P-GW or other core network nodes or functions. The local break-out function, e.g. the local break-out router, may comprise a control interface where the local break-out function and/or the copying function can be controlled. The control of the local break-out function may be performed by means of the one or more control parameters received via the control interface. The selective copying in the local break-out router may be selectively controlled via the control interface, e.g. by means of the one or more control parameters received via the control interface. That is, the selective copying may be controlled by means of the control parameters of the core network. In other words, the control interface may be used for enabling/disabling and selection of the locally routed traffic to be copied for certain core network functionalities, e.g. LI, charging of the like. In accordance therewith, the copying functionality may, in certain instances, be controlled to copy the whole locally generated traffic uplink to the core network. This is demanding for the backhaul (i.e. would cause high load). In other instances, the control functionality may be controlled to selectively copy only a fraction of the locally routed traffic to the core network.

In this way, a copy of data as the user-plane function may be used. The packets may be copied to the core network without changing the local routing. The local break-out may remain activated, but the control interface may be enabled/disabled to copy/not copy the locally routed traffic. Copying of the locally routed traffic to the core network may allow the locally routed traffic to interwork with functions such as the LI/charging functions in the core network. Selective copying of the locally routed traffic for core network functions such as LI/charging may be enabled via the control interface, thereby ensuring that traffic which is needed by the core network functions is made available for these functions such as LI/charging functionality, while the backhaul is not unnecessarily loaded with copied LSC traffic which does not have to be exposed to these functions such as LI/charging in the core network.

As described herein, control option(s) for controlling the selective copying of data related to locally routed traffic may be added to the local breakout functionality. The control options may include control of the selective copying based on one or more control parameters received from the core network. The control option(s) enabled may enable selective copying within the local break-out functionality, e.g. the local break-out router. The selective copying may be considered a more backhaul efficient solution than just copying the whole traffic.

Figure 1A:
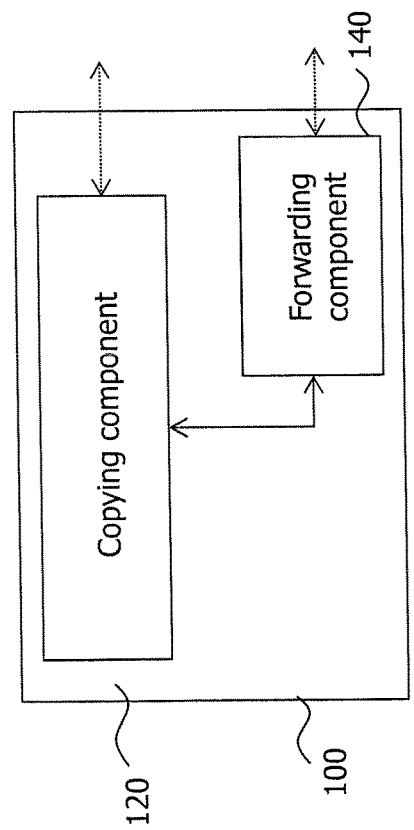
FIG. 1a is a schematic illustration of an embodiment of an apparatus.

FIG. 1a shows an embodiment of an apparatus 100 for selectively copying data, in particular for selectively copying data in a wireless communication network. The wireless communication network comprises at least one wireless device, a core network, and a local service cloud providing at least one of services and applications for the at least one wireless device. The apparatus 100 comprises a copying component 120 and a forwarding component 140. Although the copying component 120 and the forwarding component 140 are shown in FIG. 1a, by way of example, as separate components, they may equally embodied together as one copying and forwarding component that is adapted to perform the copying and the forwarding as explained in more detail herein. Examples for operation and functions of the apparatus 100 will be further described below with respect to FIG. 3a.

FIG. 1b shows an embodiment of a core network entity 200 for supporting selective copying of data in a wireless communication network. The wireless communication network comprises at least one wireless device, a core network, and a local service cloud providing at least one of services and applications for the at least one wireless device. The core network entity 200 comprises a receiving component 220 and a providing component 240. The core network entity node 200 will be further described below with respect to FIG. 3b.

Figure 2:
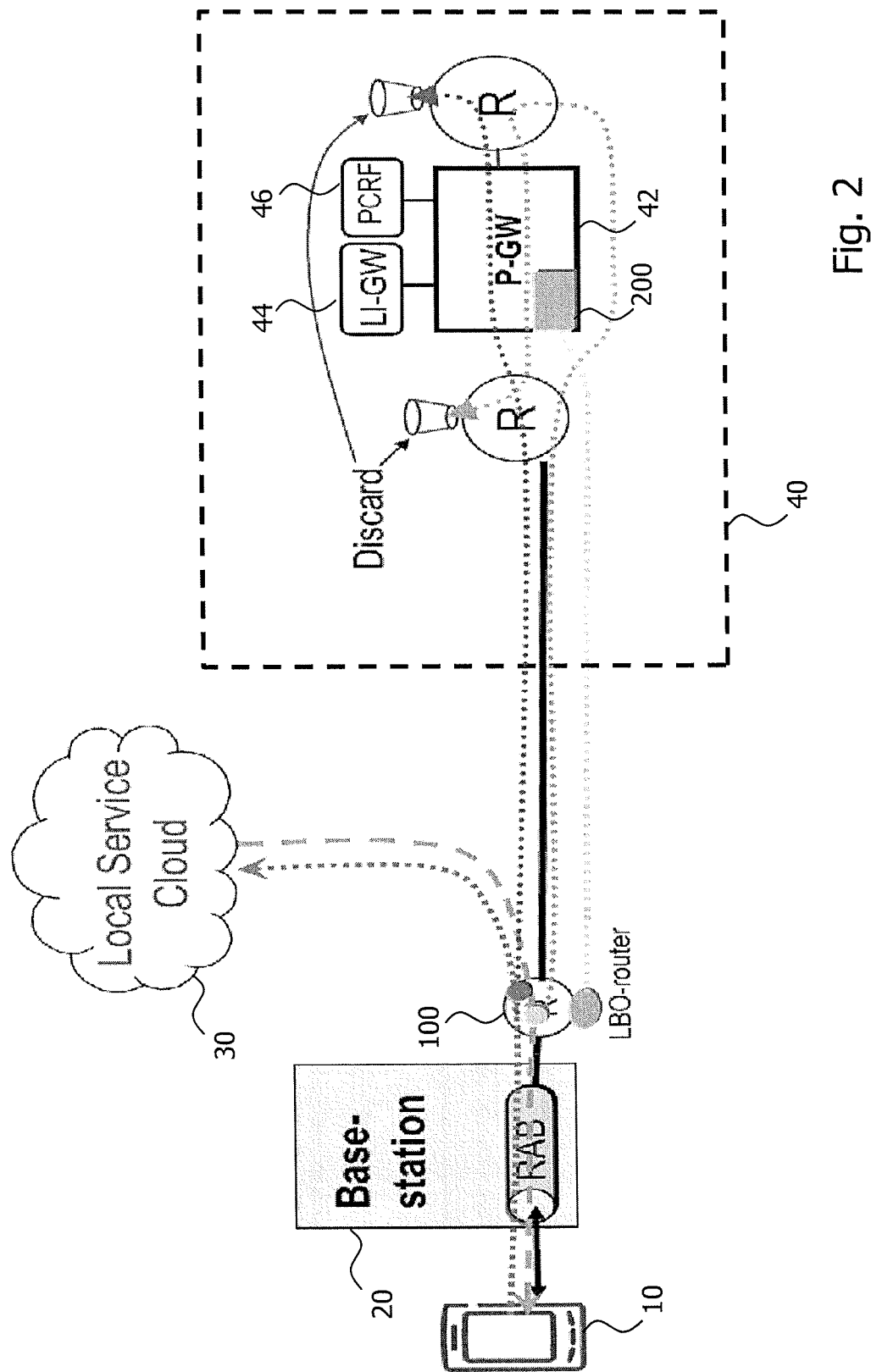
FIG. 2 is a schematic illustration of a wireless communication system comprising the embodiments of FIGS. 1a and 1b.

FIG. 2 shows, by way of example, a schematic illustration of a wireless communication network. The wireless communication of FIG. 2 is exemplarily configured as a wireless communication network conforming to the LTE standard. The wireless communication network comprises the apparatus 100 of FIG. 1a and the core network entity 200 of FIG. 1b. The wireless communication network comprises a User Equipment (UE) 10 as an example of the at least one wireless device. Although only one UE 10 is shown in FIG. 2, the wireless communication network may comprise a plurality of such UEs 10. Further, the wireless communication network comprises a base station 20 that is in the following referred to as eNodeB in accordance with LTE terminology. Further, the wireless communication network comprises a Local Service Cloud (LSC) 30 as an example of a locally provided service cloud. The LSC 30 provides at least one of services and applications for the UE 10 and the further UEs not shown in FIG. 2. The wireless communication network further comprises a core network 40. Further, by way of example, three core network nodes are shown to illustrate that the core network 40 may comprise a plurality of core network nodes. The core network 40 shown in FIG. 2 comprises, by way of example, a Public Data Network (PDN) Gateway (PGW or P-GW) 42, a Legal Intercept (LI) Gateway (LI-GW) 44, and a Policy and Charging Rules Function (PCRF) 46.

As can be seen from FIG. 2, the P-GW 42 comprises the core network entity 200, by way of example. However, alternatively or additionally, the core network entity 200 may be included or embodied in the LI-GW 44 and/or the PCRF 46 or any other core network node not shown in FIG. 2. Further, as shown exemplarily in FIG. 2, the apparatus 100, as a separate entity, is collocated with the eNodeB 20, rather than located in the eNodeB 20. However, it is equally conceivable that the apparatus 100 is embodied in or included in the eNodeB 20. By way of example, the apparatus 100 does not only contain the components mentioned above with respect to FIG. 1a, but further contains a local break-out (LBO) component. The LBO component is configured to break-out traffic and to locally route the traffic to the LSC 30 rather than to the core network 40. For sake of brevity the apparatus 100 is thus in the following referred to as LBO/copying functionality 100 to illustrate that it comprises the LBO and the copying functionality described herein. According to a different example, the LBO and the copying functionality may be separate entities capable of communication with each other.

Figure 3B:
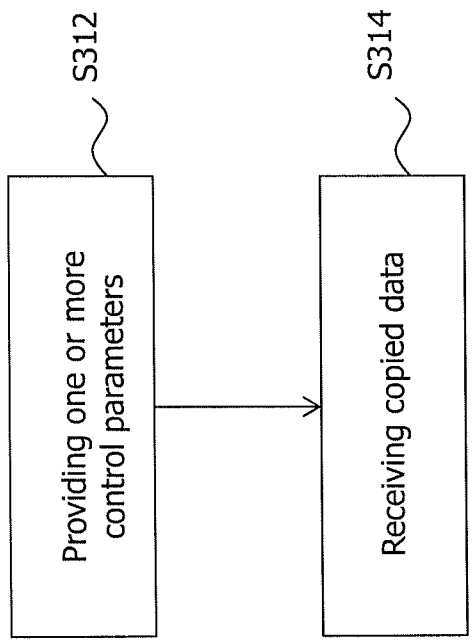
FIG. 3b is a flowchart illustrating a method embodiment performed in the core network entity of FIG. 1b.
Figure 3A:
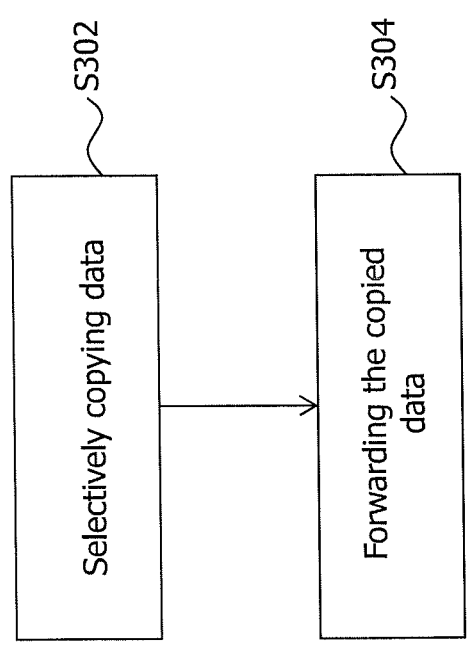

FIG. 3a shows a method embodiment which can be implemented in the LBO/copying functionality or respective components e.g. of apparatus 100. In step S302, the copying component 120 selectively copies data related to locally routed traffic based on one or more control parameters received from the core network 40. The locally routed traffic is routed locally between the UE 10 and the LSC 30. In step S304, the forwarding component 140 forwards the copied data related to the locally routed traffic to the core network 40.

FIG. 3b shows a method embodiment which can be implemented in the core network entity 200. In step S312, the providing component 220 provides on one or more control parameters to enable selective copying of data related to locally routed traffic based on the one or more control parameters provided by the core network 40. The locally routed traffic is routed locally between the UE 10 and the LSC 30. In step S314, the receiving component 240 receives the copied data related to the locally routed traffic.

By means of the exemplary configuration of FIG. 2, a control interface is added to the LBO/copying functionality 100 between the core network 40 and the eNodeB 20/LSC 30 such that selective copying can be carried out. Selective copying can be performed based on the one or more control parameters. The one or more control parameters may include end-user policies and charging rules. The end-user policies can be applied to the LBO/copying functionality 100 to enable/disable traffic to the LSC 30. The one or more control parameters may include the Access Point Name (APN) that can imply different settings of the enabling/disabling. If the end-user is associated with the appropriate APN, the local connectivity can be allowed. The one or more control parameters may include other subscription information that can provide explicit or implicit indications of whether LSC traffic should be copied for the concerned subscriber. The one or more control parameters may include parameters for selective copying of data for LI. Further, random selection of end-users may be carried out to hide activation of LI as will be explained in more detail below. The exemplary configuration of FIG. 2 may lead to lower cost for backhaul by using selective copying, while still allowing LI and charging to be applied to the LSC traffic that needs it. In this way, the core network nodes 42, 44, 46 may control the copying function of the traffic to be forwarded to the core network nodes 42, 44, 46.

In accordance with the above, control is enabled even after the LBO/LSC has been enabled. Further, specific settings of the copying function for LI and charging can be applied dependent on the one or more control parameters. Still further, the LBO/LSC can be subsequently disabled, if required, e.g. by charging limitations.

Further details regarding the LBO/copying functionality 100 and the core network entity 200 as well as the method embodiments performed therein are described below with respect to FIGS. 4 to 8. That is, the above concept will now be described without limitation in more detail with respect to FIGS. 4 to 8. For instance, examples of signaling and the logic controlling it are illustrated with respect to FIGS. 4 to 8. Even though the Figures illustrate the signaling as being performed between the P-GW 42 and the LBO/copying functionality 100 containing LBO/copying functionality (illustrated as a router function ('R') in the Figures), the signaling may in fact be terminated somewhere else, e.g., in the eNodeB 20 or at a separate site, which subsequently instructs the LBO/copying functionality 100 accordingly. All of these options are feasible. That is, the LBO/copying functionality 100 may be an integral part of the eNodeB, but may also be a separate entity that is collocated with the eNodeB 20 (as shown in FIG. 2) or even located at a separate site.

With respect to FIG. 4 steps in the control of the access to the LSC 30 and the potential copying of traffic that is broken out to the LSC 30 is explained in more detail. In the flowchart of FIG. 4 it is determined whether the LSC 30 and/or LBO is to be enabled or disabled.

In step S402, the LBO/copying functionality 100 enquires with the core network entity 200 (that is exemplarily embodied in the P-GW 42) whether the LSC 30 is enabled to the UE 10. It is then determined in step S404 whether PCRF rules admit the UE 10 to connect to the LSC 30. In accordance therewith, the core network entity 200 checks in step S404, if access to the LSC 30 is allowed or not allowed for a certain subscriber, i.e., the UE 10, possibly specified per service/application. If the LSC 30 is not allowed for the UE 10, the core network entity 200 signals to the LBO/copying functionality 100 that the LSC 30 is not allowed to be accessed by the client (step S406). If, however, query S404 is answered in the affirmative, it is checked if the UE 10 belongs to an APN that is LSC enabled (step S408). If not, the core network entity 200 signals to the LBO/copying functionality 100 that the LSC 30 is not allowed to be accessed by the client (step S406). If, however, query S408 is answered in the affirmative, the core network entity 200 responds to the LBO/copying functionality 100 that the LSC 30 is enabled for the client (step S410). Query S408 may be answered in the affirmative for at least one or more APNs that may be configured specifically to deal with Cloud services such as services hosted by the LSC 30, while other APNs are excluded.

In the flowchart of FIG. 4, the UE 10 must both be admitted by the PCRF rules and belong to a Cloud enabled APN. If both are conditions are fulfilled, the P-GW 42 informs the LBO/copying functionality 100 that the UE 10 is allowed to access services and/or applications of the LSC 30, e.g. by sending an "enable_cloud" event. In accordance therewith, the LBO/copying functionality 100 starts its LBO functions. Otherwise a "Cloud is not allowed event" may be sent in step S406.

Whether a certain UE 10 is admitted to access an LSC 30 may be affected by various circumstances, such as the current load in the LSC 30, the location, time of day or day of week, etc. Such circumstances may also be input data to the PCRF policies, in which case these conditions are taken into account in the flowchart of FIG. 4, where the PCRF policies are checked in step S404.

There may be other variants to determine whether an LSC is enabled or not, e.g., when only the APN is checked. This is exemplarily illustrated by the flowchart of FIG. 5. For details of steps S502, S504, S506 and S508 it is, for sake of brevity, to the explanation of steps S402, S406, S408 and S410. In short, in step S502, the LBO/copying functionality 100 enquires with the core network entity 200 whether the LSC 30 is enabled to the UE 10. In accordance therewith, the core network entity 200 checks in steps S504 if the UE 10 belongs to a certain APN that is LSC 30 enabled. If not, the core network entity 200 signals to the LBO/copying functionality 100 that the LSC 30 is not allowed to the client (step S506). If, however, query S504 is answered in the affirmative, the core network entity 200 responds to the LBO/copying functionality 100 that the LSC 30 is enabled for the client (step S508).

After checking whether an LSC 30 is enabled to a UE 10, it can be checked whether LI and/or the PCRF/charging system require inspection of the LSC traffic for this particular subscriber, UE 10 or service/traffic flow and to activate copying of the concerned LSC traffic if this is the case. Details of this process can be described, for explanation rather than limitation, by the flowchart of FIG. 6.

Figure 5:
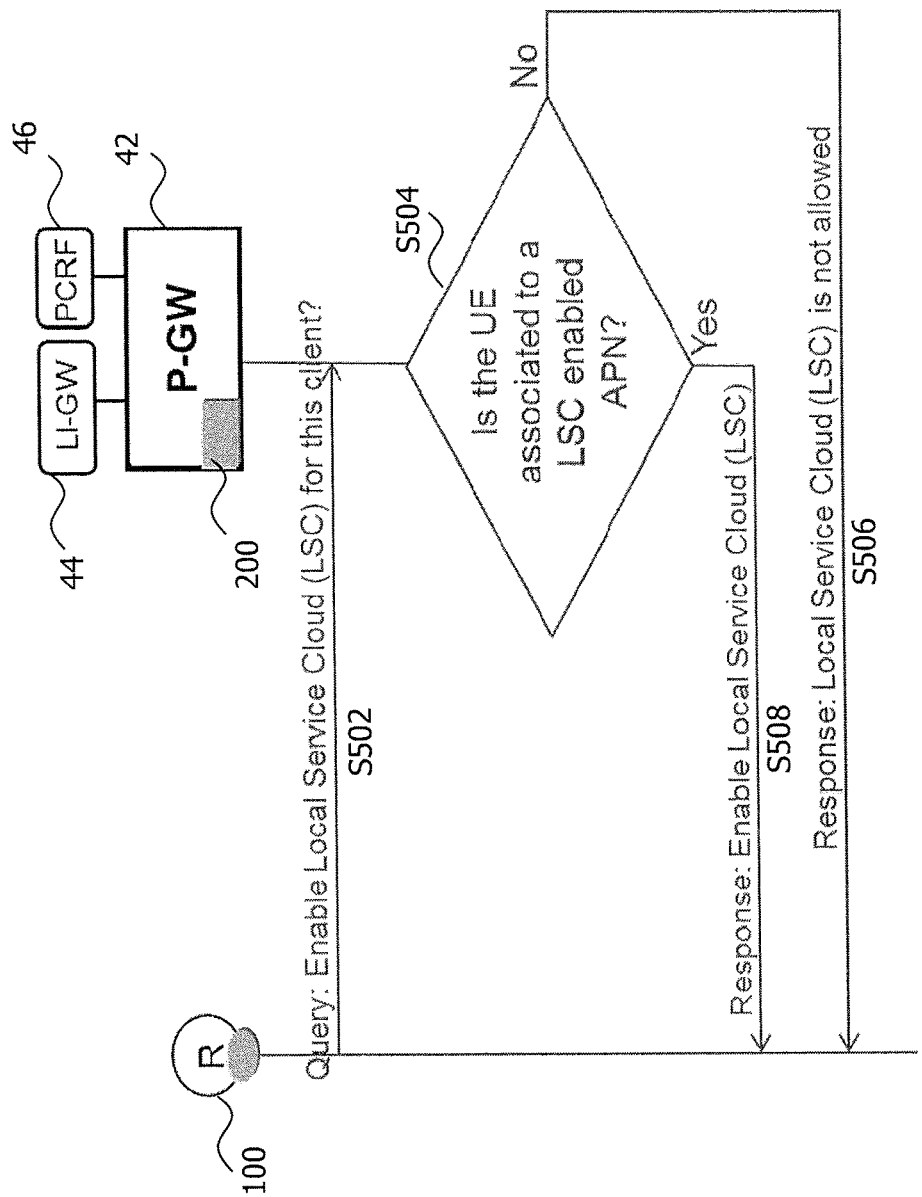
FIG. 5 is a flowchart illustrating details that may be performed prior to the method embodiments of FIGS. 3a and 3b.

The steps S602, S604 and S606 may be performed to check whether an LSC 30 is enabled to a UE 10 as explained, by way of example, with respect to FIGS. 4 and 5. If the outcome of the flowcharts of FIGS. 4 and 5 is positive, the LI system is checking in step S608 if the end-user of the UE 10 is exposed to LI. If so, it is decided that all packets are to copied to the core network (step S610) and the LBO/copying functionality 100 is instructed accordingly (step S612).

If query S608 is answered with "no", the UE 10 may still be randomly selected by the core network entity 200 for data copying in order to hide LI performed on other UEs (step S614). In general, to hide that LI is currently carried out, some UEs (not shown in FIG. 2) served by the eNodeB 20 may be randomly selected. In other words, in order to decrease the probability of detection of LSC packets being copied (e.g. through monitoring of the eNodeB 20 operation), thereby of exposing which users are subject to LI (which may be revealed if someone manages to monitor which traffic flows are copied to the core network), a set of UEs/users for which LI is not to be applied could still be randomly selected for copying of their LSC traffic to the core network (as if they were exposed to LI). In principle, the association between copying of LSC traffic to the core network 40 and the application of LI is hidden by the randomly selected UEs/users. For the selected UEs/users, like in case of LI, it may be decided that all traffic is to be copied in step S610 and the LBO/copying functionality 100 is instructed accordingly (step S612). This adds more copied traffic and thus increases the load on the backhaul. This traffic will be dropped in the core-network.

The randomly selected UEs/users could be selected in step e.g. using an algorithm with a fixed probability. Another more sophisticated algorithm would also take into account the number of UEs/users in a certain cell—or a certain eNodeB—that are actually subject to LI and adapt the probability for random selection of other UEs/users in the cell/eNodeB, so that the fraction of UEs/users in a cell/eNodeB on average remains the same. That is, the more UEs/users are subject to LI, the lower the probability for random selection of one of the other UEs/users. To support such a scheme, an eNodeB could inform the core network 40 whenever a UE appears in a cell (e.g. switching from idle to connected state in the cell) or moves between cells, either using the UE location reporting feature (e.g. in EPS/LTE) or the herein described control interface of the LBO/copying functionality 100 between the core network 40 and the eNodeB/LSC. The state information that a UE/user is randomly selected for LSC traffic copying may or may not be transferred to another base station/cell in conjunction with handover. Both options are conceivable. If the state information is transferred for a UE/user that is actually subject to LI, the state information that the UE's/user's LSC traffic should be copied can be transferred during handover. In this case, the eNodeB cannot tell the difference between randomly selected UEs/users and UEs/users actually subject to LI.

A variant of the random UE/user selection scheme would be that the core network 40 does not request the eNodeB 20 to copy LSC traffic of randomly selected UEs/users. Instead, the core network 40 requests the eNodeB 20 to randomly select UEs/users for LSC traffic copying. In such a request the core network 40 may optionally include a selection probability or a target fraction of UEs/users for the eNodeB 20 to use when randomly selecting UEs/users. With the variant where the eNodeB 20 performs the random selection, the state information that a UE is randomly selected is, for example, not transferred during handovers.

Figure 6:
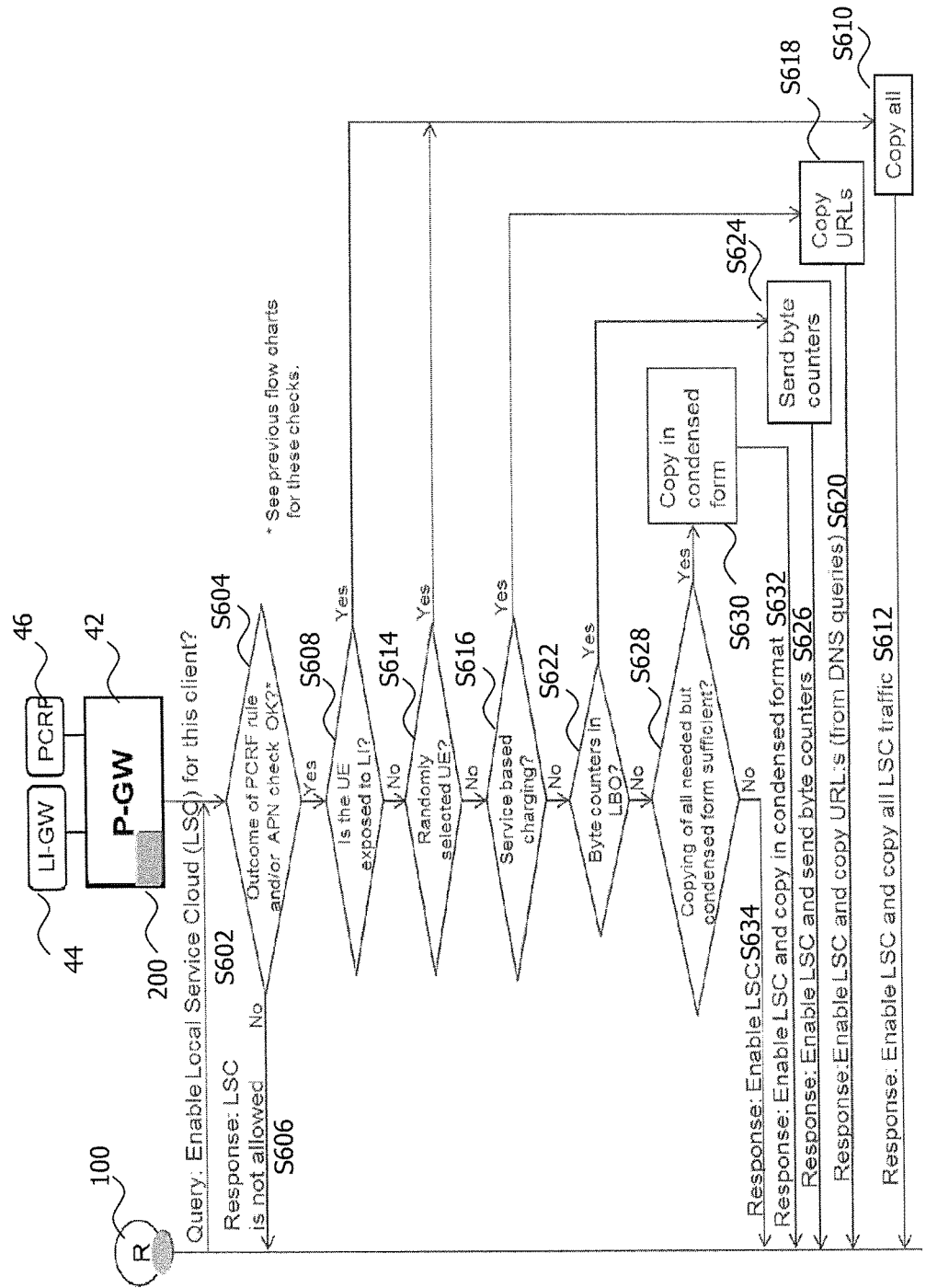
FIG. 6 is a flowchart illustrating details that may be performed in the method embodiments of FIGS. 3a and 3b.

In the next steps of the flowchart of FIG. 6, the type of charging reporting is determined. In step S616 it is determined whether service based charging is to be applied. If so, it is decided in step S618 that only the URLs may be copied (e.g., from Http-GET) and the LBO/copying functionality 100 is instructed accordingly in step S620. For this purpose, fully qualified domain names (FQDNs) may be extracted from Domain Name System (DNS) queries. FQDN could indicate a specific service in the LSC 30. If the answer to query S616 is negative, it is determined in step S622 whether byte counting of the LSC traffic is to be applied. If so, only the byte counters are to be provided to the core network 40. For this purpose, it is determined to apply byte counting in step S624 and the LBO/copying functionality 100 is instructed accordingly in step S626. If byte counting is not to be applied, it is determined in step S628 whether a more condensed format is sufficient instead of copying of everything. The more condensed format may be formed by omitting the payload in the copied packets and only sending header information, such as IP header, transport layer protocol header (e.g. TCP, UDP, SCTP . . . ) and/or application layer header. If the answer to query S628 is "yes", the LBO/copying functionality is instructed to copy the LSC traffic in the more condensed format (steps S630 and S632). If all queries are answered with "no", the LBO/copying functionality 100 is finally instructed to enable the LSC 30, but to not carry out any copying.

Figure 7:
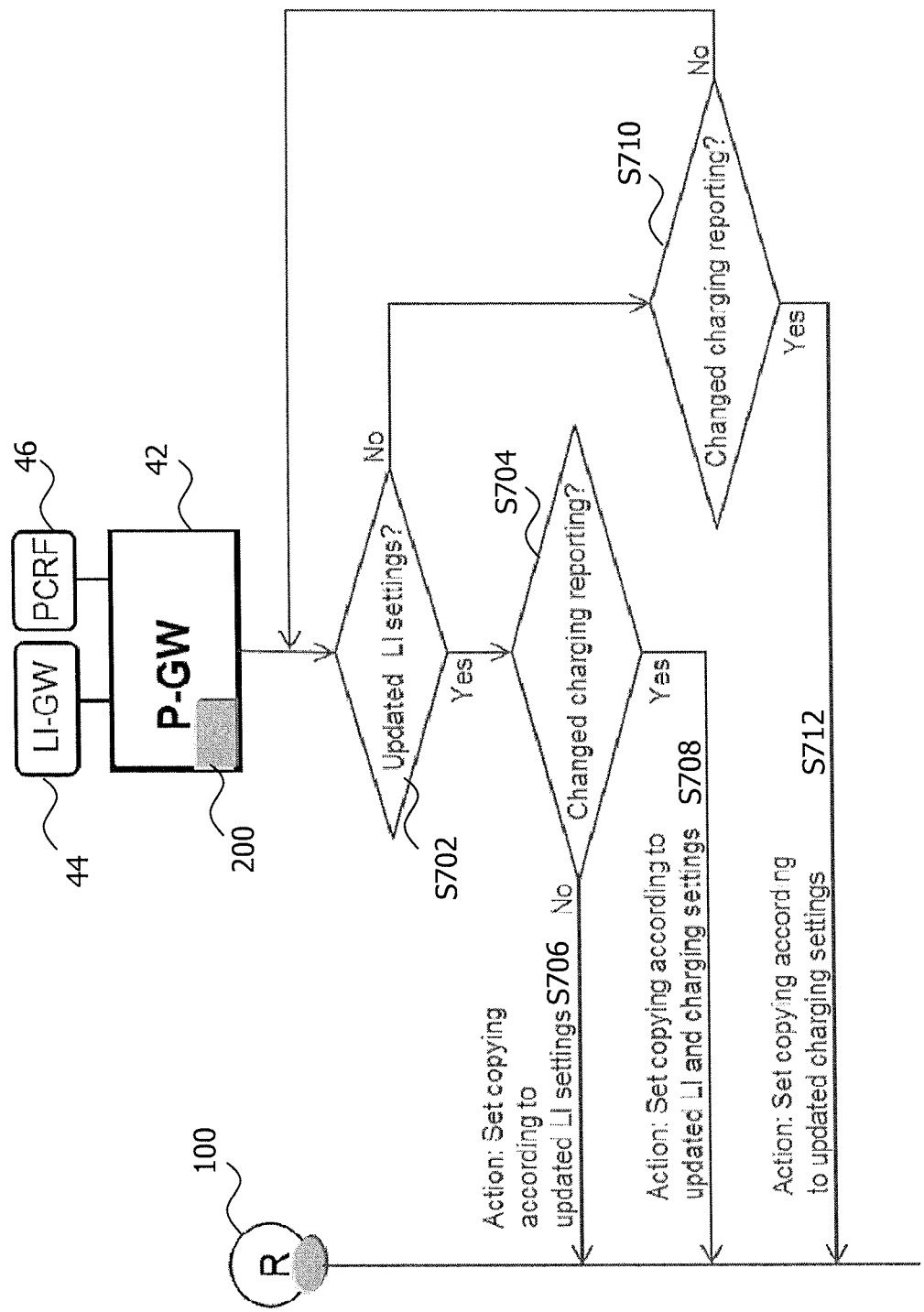
FIG. 7 is a flowchart illustrating details that may be performed in the method embodiments of FIGS. 3a and 3b.

With respect to FIG. 7 it is explained how the core network 40 can change the settings of ongoing, i.e. previously enabled, LBO(s). For example, LI settings and charging policies may be updated. In step S702 it is determined whether there are updated LI settings, for example. If so, it is determined in step S704 whether changed charging reporting is required. If not, the copying is set to the changed/updated LI settings in step S706, i.e. the LBO/copying functionality 100 is instructed to apply the updated LI settings. If there is also changed charging reporting, the copying is set to the updated LI settings and changed charging reporting in step S708, i.e. the LBO/copying functionality 100 is instructed to apply the updated LI settings and changed charging reporting. If however, there are no updated LI settings, it is determined in step S710 whether there is changed charging reporting. If so, the copying is set to the changed charging settings i.e. the LBO/copying functionality 100 is instructed to apply the changed charging reporting (step S712). If not, the core network entity 200 waits for updated or changes.

Figure 8:
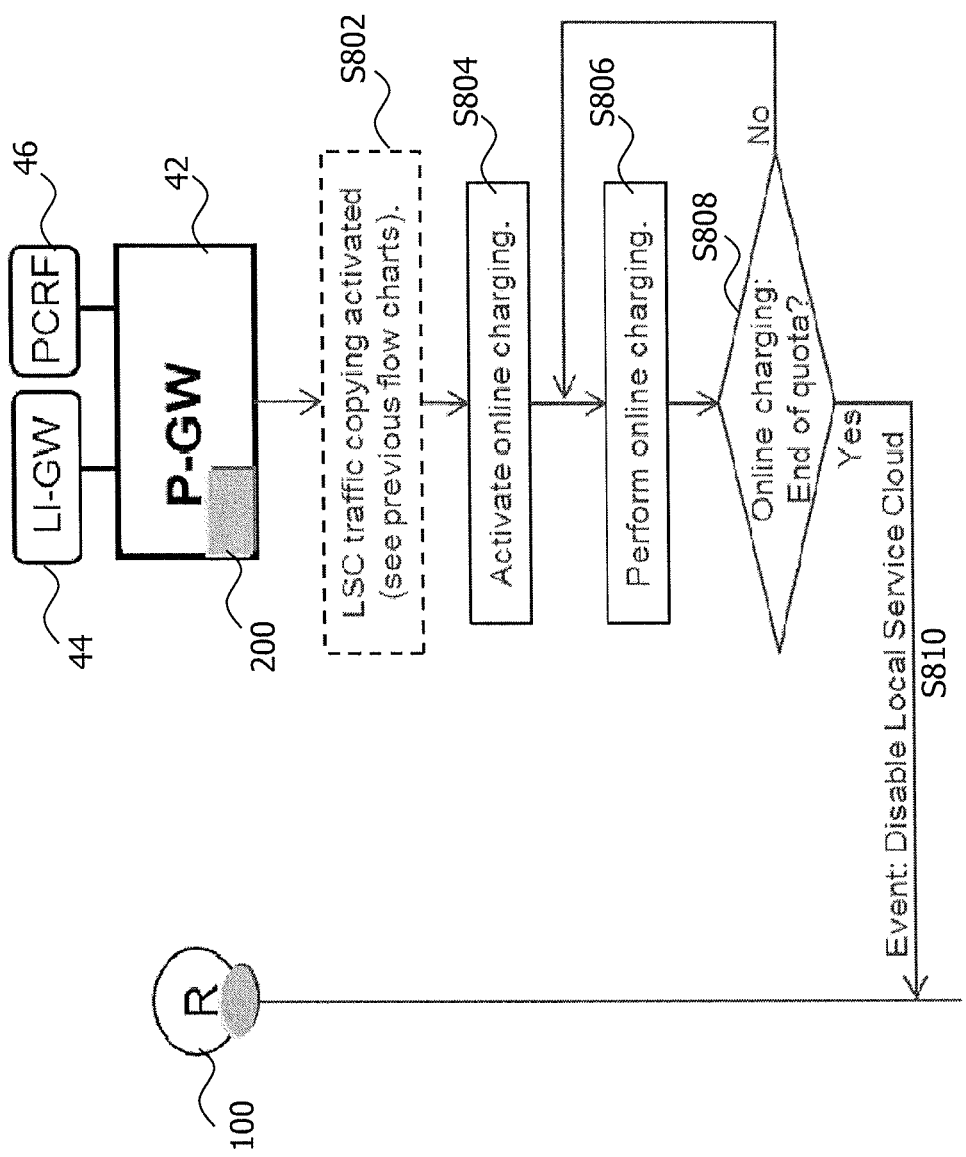
FIG. 8 is a flowchart illustrating details that may be performed in the method embodiments of FIGS. 3a and 3b.

Another event that can change the settings is when the end-user is out-of-quota for on-line charging. This will require that the LBO/copying functionality 100 changes the use of the LSC 30 for the specific end-user. Usually, the end-user will be routed to the web page where the "out-of-quota" information is shown. In this case, the LSC 30 will be disabled. The foregoing is shown in FIG. 8. In step S802 it is determined whether LSC traffic copying is activated. If so, it is determined in step S804 whether online charging is activated. Then, online charging is performed in step S806. In step S808 it is determined whether online charging is out-of-quota. If not, online charging is still performed in step S806. If, however, the online charging is out-of-quota, the LSC 30 is disabled in step S810, i.e. the LBO/copying functionality 100 is instructed to disable the LSC 30.

If handover is required, the LI/charging control state can be moved to the target eNodeB to enable seamless continuity of the LI/charging. For example, the LI/charging control state can be seen as part of the LBO state and as such it may be moved to the target eNodeB at handover together with the rest of the LBO state. An alternative could be that the LI/charging control state is recreated from the core network 30, e.g. the P-GW 42, following the same sequence as explained above with respect to FIGS. 4 to 8.

Different options for the control plane transport between the LBO/copying functionality 100 and the core network entity 200 exist, e.g. the communication between the P-GW 42 and the eNodeB 20 could be conveyed through various means. The options described in the following are equally applicable to any of the traffic and/or control signaling described herein.

For example, inband messaging in the user-plane may be used. For instance, it is conceivable to use standardized or vendor specific extensions of the GTP-U header (uplink and downlink) and add the communication as a part of the extensions. GPRS Tunneling (GTP) is already prepared for extension via extension headers, so it can carry LBO/LSC/packet copying control signaling. As such, they could be opportunistically appended to any user data packet or, in the absence of such user data packets to utilize, could be sent as separate GTP-U packets with empty payload. A hybrid of these two alternatives could be to start a timer when there is control information to be transferred and wait for a user data packet to utilize while the timer is running. If the timer expires, the control information would be sent in a separate GTP-U packet with empty payload. The timer's start value could be adapted to the nature of the control information, such that the timer expires more quickly the more time critical the control information is. For example, one and the same extension header could be used for conveying control information (through simple encapsulation), irrespective of the contents of the control information (i.e., the one or more control parameters). A possible alternative is to define several different extension headers for different kinds of control information. It is then also possible to add multiple extension headers, carrying control information, to the same GTP-U packet. The signaling messages may also be inserted as separate packets in the user data stream. They would be indicated by pre-defined parameters in the IP header, the transport layer header and/or the application layer header, so that they can be extracted by the core network entity 200 and the LBO/copying functionality 100, e.g., the P-GW 42 and the eNodeB 20, respectively. Still further, UPCON could be used for carrying the concerned control signaling. In this case, UPCON may be equipped with a possibility to transfer opaque information for other functionality than congestion related functionality.

An alternative is to let the transport be made between the LBO/copying functionality 100, an Mobility Management Entity (MME) and the core network entity 200, e.g., between the eNodeB 20, an MME and the P-GW 42. In this case, the transport is using the knowledge in the MME to route the control-plane packets to the appropriate eNodeB.

Yet an alternative is to transfer the core network entity 200 and LBO/copying functionality 100 signaling, e.g. the P-GW 42 and eNodeB 20 signaling, separately through the operator's transport network.

Figure 9:
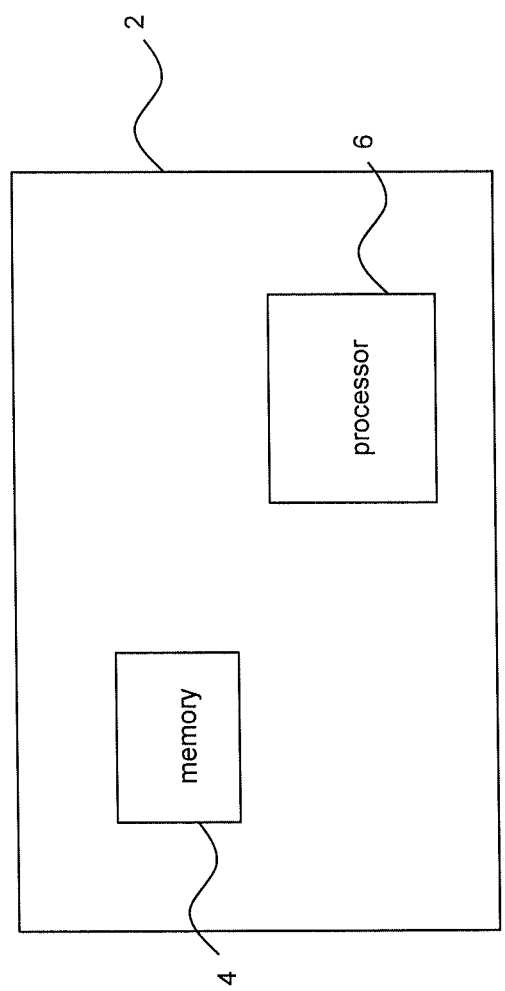
FIG. 9 is a block diagram schematically illustrating another device embodiment for implementing the apparatus of FIG. 1.

The details explained above with respect to FIGS. 3a to 7 may be summarized with respect to FIG. 9. FIG. 9 is a block diagram schematically illustrating a device embodiment of a node 2 for selectively copying data in a wireless communication network, the wireless communication network comprising at least one wireless device, a core network, and a local service cloud providing at least one of services and applications for the at least one wireless device By way of example, the node 2 is described to implement the functionalities of the apparatus 100 according to the embodiment of FIG. 1a. Alternatively or additionally, the node 2 may implement the functionalities of the core network entity 200 according to the embodiment of FIG. 1b. The node 2 comprises a memory or memory arrangement 4 and a processor or processor arrangement 6. The memory or memory arrangement 4 contains control instructions or program code portions executable by the processor or processor arrangement 6. The processor or processor arrangement is configured to selectively copy data related to locally routed traffic based on one or more control parameters received from the core network and/or executing the control instruction in the memory or memory arrangement. The locally routed traffic is routed locally between the at least one wireless device and the local service cloud. The processor or processor arrangement 6 is configured to forward the copied data related to the locally routed traffic to the core network and/or to control such forwarding. A processor arrangement may generally comprise one or more than one processors and/or processor cores. A processor or processor core may comprise integrated control or processing circuitry. A memory arrangement may comprise one or more than one memories, which may be of same or different types. A memory may comprise RAM (Random Access Memory), ROM (Read-Only Memory), EPROM, cache memory, optical memory, etc.

Figure 10:
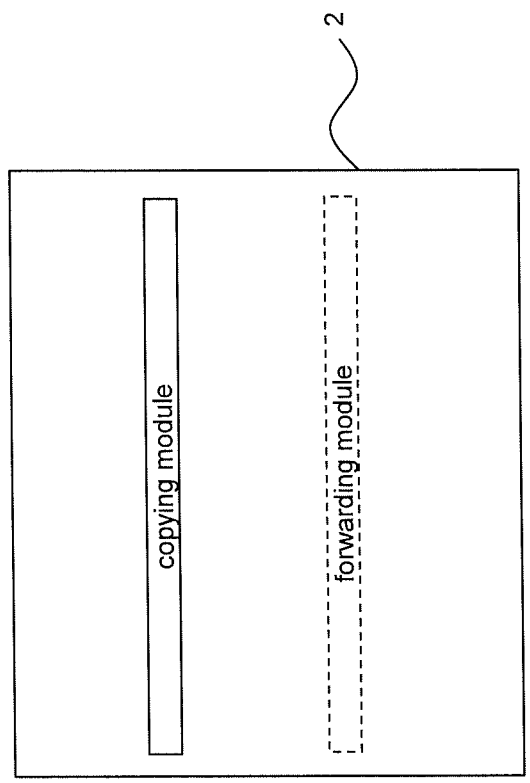
FIG. 10 is a block diagram schematically illustrating another device embodiment for implementing the apparatus of FIG. 1.

FIG. 10 shows a functional block diagram of a device or node 2 configured in accordance with the principles of the disclosure as described above. In particular, device or node 2 may be seen as representing an apparatus for selectively copying data in a wireless communication network as disclosed herein. The functional blocks of the device may be implemented by hardware, software, or a combination of hardware and software to carry out the principles of the disclosure. It is understood by a person skilled in the art that the functional blocks described in FIG. 10 may be combined or separated into sub-blocks to implement the principles of the disclosure as described above. Therefore, the description herein may support any possible combination or separation or further definition of the functional blocks described herein. The device of FIG. 10 is for selectively copying data in a wireless communication network. The wireless communication network comprises at least one wireless device, a core network, and a local service cloud. The local service cloud provides at least one of services and applications for the at least one wireless device. The device 2 comprises a copying module for selectively copying data related to locally routed traffic based on one or more control parameters received from the core network. The locally routed traffic is routed locally between the at least one wireless device and the local service cloud. The device 2 further comprises a forwarding module for forwarding the copied data related to the locally routed traffic to the core network.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

The invention claimed is:

1. A method of selectively copying data in a wireless communication network, the wireless communication network comprising a plurality of wireless devices, a core network, and a local service cloud providing at least one of services and applications for the plurality of wireless devices, the method comprising:
 selectively copying first data related to locally routed traffic, based on one or more control parameters received from the core network, the locally routed traffic being routed locally between one or more wireless devices of the plurality of wireless devices and the local service cloud, wherein the one or more wireless devices are subject to lawful interception;
 randomly selecting one or more other wireless devices from the plurality of wireless devices;
 copying second data related to locally routed traffic being routed locally between the selected one or more other wireless devices and the local service cloud, wherein the selected one or more other wireless devices are not subject to lawful interception; and
 forwarding the copied first and second data to the core network.

2. The method of claim 1, wherein the copied first and second data comprises at least one of: one or more packets of the locally routed traffic, header information of one or more packets of the locally routed traffic, information about one or more web addresses of the locally routed traffic, and information about an amount of the locally routed traffic.

3. The method of claim 1, wherein the method comprises selecting the first and second data to be copied based on the one or more control parameters from the core network.

4. The method of claim 1, wherein the method comprises receiving one or more updated control parameters from the core network.

5. The method of claim 1, wherein the one or more control parameters comprise at least one of: information related to policies contained in the core network, information related to charging rules contained in the core network, information about an Access Point Name (APN) of the core network, subscription information contained in the core network, information related to geographical location(s) or region(s), and information related to lawful interception contained in the core network.

6. The method of claim 1, wherein selectively copying the first data related to the locally routed traffic being routed locally between the one or more wireless devices and the local service cloud, comprises:
 copying one or more packets of the locally routed traffic that is routed locally between the one or more wireless devices and the local service cloud, if the one or more wireless devices of the plurality of wireless devices are subject to lawful interception, and
 wherein the method further comprises at least one of:
 copying information about one or more web addresses of locally routed traffic that is subject to service based charging in the core network; and
 copying information about an amount of locally routed traffic that is subject to traffic volume-based charging or bucket charging in the core network.

7. The method of claim 1, wherein randomly selecting the one or more other wireless devices from the plurality of wireless devices comprises randomly selecting the one or more other wireless devices with a fixed probability.

8. The method of claim 1, wherein randomly selecting the one or more other wireless devices from the plurality of wireless devices comprises randomly selecting the one or more other wireless devices with an adjustable probability, and wherein the adjustable probability is adapted by taking into account a number of wireless devices among the plurality of wireless devices that are subject to lawful interception.

9. The method of claim 8, wherein the adjustable probability is adapted such that the adjustable probability is increased when the number of wireless devices that are subject to lawful interception is below a predetermined value, and the adjustable probability is decreased when the number of wireless devices that are subject to lawful interception is above a predetermined value.

10. The method of claim 1, wherein the one or more control parameters, received from the core network, control at least one of:
 a probability with which the one or more other wireless devices from the plurality of wireless devices are randomly selected; and
 an algorithm for adjusting a probability with which the one or more other wireless devices from the plurality of wireless devices are randomly selected.

11. A method of supporting selective copying of data in a wireless communication network, the wireless communication network comprising a plurality of wireless devices, a core network, and a local service cloud providing at least one of services and applications for the plurality of wireless devices, the method comprising:
 providing, by the core network, one or more control parameters to enable selective copying of first data related to locally routed traffic based on the one or more control parameters, wherein the locally routed traffic is routed locally between one or more wireless devices of the plurality of wireless devices and the local service cloud, wherein the one or more wireless devices are subject to lawful interception;
 randomly selecting, by the core network, one or more other wireless devices from the plurality of wireless devices to enable copying of second data related to locally routed traffic being routed locally between the selected one or more other wireless devices and the local service cloud, wherein the selected one or more other wireless devices are not subject to lawful interception; and receiving, by the core network, the copied first and second data.

12. The method of claim 11, wherein the method comprises determining whether copying of the first data is required by the core network, and if copying of the first data is required, activating selective copying of the first data.

13. The method of claim 11, wherein the method comprises updating the one or more control parameters and providing the one or more updated control parameters.

14. The method of claim 13, wherein updating the one or more control parameters comprises at least one of: updating information related to lawful interception contained in the core network, updating information related to policies contained in the core network, and updating information related to charging rules contained in the core network.

15. The method of claim 11, wherein the method further comprises at least one of:
analyzing the copied first and second data in the core network;
carrying out service based charging in the core network based on the copied first and second data; and
carrying out traffic volume based charging or bucket charging in the core network based on the copied first and second data.

16. A method of selectively copying data in a wireless communication network, the wireless communication network comprising a plurality of wireless devices, a core network, and a local service cloud providing at least one of services and applications for the plurality of wireless devices, the method comprising:
providing, by the core network, one or more control parameters;
selectively copying first data related to locally routed traffic based on the one or more control parameters received from the core network, wherein the locally routed traffic is routed locally between one or more wireless devices of the plurality of wireless devices and the local service cloud, wherein the one or more wireless devices are subject to lawful interception;
randomly selecting one or more other wireless devices from the plurality of wireless devices;
copying second data related to locally routed traffic being routed locally between the selected one or more other wireless devices and the local service cloud, wherein the selected one or more other wireless devices are not subject to lawful interception;
forwarding the copied first and second data to the core network; and
receiving, by the core network, the copied first and second data.

17. A non-transitory computer readable medium storing a computer program for selectively copying data in a wireless communication network, the wireless communication network comprising a plurality of wireless devices, a core network, and a local service cloud providing at least one of services and applications for the plurality of wireless devices, the computer program comprising program code portions to be executed by at least one processor of an apparatus for causing the apparatus to:
selectively copy first data related to locally routed traffic based on one or more control parameters received from the core network, the locally routed traffic being routed locally between one or more wireless devices of the plurality of wireless devices and the local service cloud, wherein the one or more wireless devices are subject to lawful interception;
randomly select one or more other wireless devices from the plurality of wireless devices;
copy second data related to locally routed traffic being routed locally between the selected one or more other wireless devices and the local service cloud, wherein the selected one or more other wireless devices are not subject to lawful interception; and
forward the copied first and second data to the core network.

18. A non-transitory computer readable medium storing a computer program for supporting selective copying data in a wireless communication network, the wireless communication network comprising a plurality of wireless devices, a core network, and a local service cloud providing at least one of services and applications for the plurality of wireless devices, the computer program comprising program code portions to be executed by at least one processor of the core network for causing the core network to:
provide one or more control parameters to enable selective copying of first data related to locally routed traffic based on the one or more control parameters, wherein the locally routed traffic is routed locally between one or more wireless devices of the plurality of wireless devices and the local service cloud, wherein the one or more wireless devices are subject to lawful interception;
randomly select one or more other wireless devices from the plurality of wireless devices to enable copying of second data related to locally routed traffic being routed locally between the selected one or more other wireless devices and the local service cloud, wherein the selected one or more other wireless devices are not subject to lawful interception; and
receive the copied first and second data.

19. An apparatus configured for selectively copying data in a wireless communication network, the wireless communication network comprising a plurality of wireless devices, a core network, and a local service cloud providing at least one of services and applications for the plurality of wireless devices, the apparatus comprising:
communication circuitry configured for communication at least with the core network; and
processing circuitry operatively associated with the communication circuitry and configured to:
selectively copy first data related to locally routed traffic based on one or more control parameters received from the core network, wherein the locally routed traffic is routed locally between one or more wireless devices of the plurality of wireless devices and the local service cloud, wherein the one or more wireless devices are subject to lawful interception;
randomly select one or more other wireless devices from the plurality of wireless devices;
copy second data related to locally routed traffic being routed locally between the selected one or more other wireless devices and the local service cloud, wherein the selected one or more other wireless devices are not subject to lawful interception; and
forward the copied first and second data to the core network.

20. A base station comprising the apparatus of claim 19.

21. A core network entity configured for supporting selective copying of data in a wireless communication network, the wireless communication network comprising a plurality of wireless devices, a core network, and a local service cloud providing at least one of services and applications for the plurality of wireless devices, the core network entity comprising:
- communication circuitry configured for communication within the wireless communication network; and
- processing circuitry operatively associated with the communication circuitry and configured to:
- provide one or more control parameters to enable selective copying of first data related to locally routed traffic based on the one or more control parameters, wherein the locally routed traffic is routed locally between the one or more wireless devices of the plurality of wireless devices and the local service cloud, wherein the one or more wireless devices are subject to lawful interception;
- randomly select one or more other wireless devices from the plurality of wireless devices to enable copying of second data related to locally routed traffic being routed locally between the selected one or more other wireless devices and the local service cloud, wherein the selected one or more other wireless devices are not subject to lawful interception; and
- receive the copied first and second data.

* * * * *